United States Patent [19]

Elias et al.

[11] Patent Number: 5,010,129

[45] Date of Patent: Apr. 23, 1991

[54] PETROLEUM RESISTANT COATING AND METHOD OF PREPARING SAME

[75] Inventors: Samir F. Elias; Daryl K. Morrison, both of Wichita, Kans.

[73] Assignee: Koch Industries, Inc., Wichita, Kans.

[21] Appl. No.: 221,035

[22] Filed: Jul. 18, 1988

Related U.S. Application Data

[63] Continuation-in-part of Ser. No. 115,332, Nov. 2, 1987, abandoned.

[51] Int. Cl.$^5$ .................. C08L 31/04; C08K 3/34
[52] U.S. Cl. .................... 524/413; 524/443; 524/446; 524/451; 524/449; 524/427; 524/563
[58] Field of Search ............ 524/475, 486, 413, 443, 524/446, 451, 449, 427, 563

[56] References Cited

U.S. PATENT DOCUMENTS

| | | | |
|---|---|---|---|
| 3,932,307 | 1/1976 | Setterquist | 526/348 |
| 4,243,568 | 1/1981 | Brown | 524/475 |
| 4,363,887 | 12/1982 | Leep | 524/475 |
| 4,404,311 | 9/1983 | Mathis et al. | 524/486 |
| 4,497,927 | 2/1985 | Tai et al. | 524/475 |

FOREIGN PATENT DOCUMENTS

| | | |
|---|---|---|
| 2528696 | 1/1977 | Fed. Rep. of Germany . |
| 56-116729 | 9/1981 | Japan .................... 524/486 |

OTHER PUBLICATIONS

Chemical Abstracts, AN CA79(4):19889z, "Pressure Sensitive Adhesives", Kosaka et al., 2/22/1973.
Derwent Abstracts, AN 78-46716A/26, "Water-dispersible adhesive composition", 5/22/78.

*Primary Examiner*—Paul Lieberman
*Assistant Examiner*—Christine A. Skane
*Attorney, Agent, or Firm*—Kokjer, Kircher, Bradley, Wharton, Bowman & Johnson

[57] ABSTRACT

A coating exhibiting superior resistance to petroleum products and an absence of known carcinogens as well as a method of preparing same is the subject of the present invention. The coating comprises a combination of a water slurry of filler material to which a latex polymer and coupling agent have been added together with a polyphenyl compound to which plasticizer and surfactant have been added. The water slurry comprises 40-60 weight percent water, 15-35 weight percent filler, 1-10 weight percent latex polymer, 0-2.0 weight percent coupling agent and up to 1 percent by weight colorant. The binder base comprises 10-50 weight percent tertiary or higher polyphenyls, 1-6 percent by weight compatible plasticizer, and 0.05 to 1.0 weight percent nonionic high molecular weight polyester surfactant and is heated. After heating, the binder base and water slurry are combined to form the composition of the invention. A thickener, adhesion promoter and bacteriostat may be added to the product.

11 Claims, No Drawings

PETROLEUM RESISTANT COATING AND METHOD OF PREPARING SAME

This is a continuation-in-part of application Ser. No. 115,332, filed Nov. 2, 1987 now abandoned.

The present invention relates generally to protective coatings and, more particularly, to a coating exhibiting superior petroleum resistance and an absence of known carcinogens, and to a method of preparing same.

Asphalt and concrete are the most widely used permanent hard surface paving materials. Both of these materials are subject to deterioration over time from water, ice matters and petroleum spills.

The greatest threat to the integrity of many pavement surfaces, especially asphalt, is presented by fuel and oil from automobile engines. Any type of petroleum based fuel will have a severe detrimental effect over time on an asphalt surface. Water is not as great a threat to pavement surfaces as petroleum products unless the water stands on the surface in which case it can be very detrimental.

It has heretofore been known to apply a protective coating to pavement for the purpose of protecting it against water, vehicle fuels and other adverse chemicals. The most widely used coating at the present time is a product which includes emulsified coal-tar or coal-tar dissolved in an organic solvent. This coating is particularly adapted for use on asphalt pavements. It is now known that coal-tar is a carcinogen which presents a health hazard over time to those having significant exposure to it. While there have been attempts to formulate alternative coatings to replace coal-tar, the known substitutes which are noncarcinogenic in nature do not provide the desired degree of resistance to petroleum products as is possible with a coal-tar base coating. Also, the substitute coatings which have been devised generally are considerably more expensive than the known coal-tar coatings thus limiting usage of the safe substitutes.

It is, therefore, a primary objective of the present invention to provide a coating having good resistance to petroleum products but which does not contain any known carcinogens.

Another very important objective of our invention is to provide a petroleum resistant coating which is free of known carcinogens but is comparable in cost to coal-tar base coatings.

Another important one of the aims of the invention is to provide a coating which is fuel resistant, does not utilize known carcinogens and is water soluble thus rendering the product easy to clean up and safe to store and transport.

It is another important objective of our invention to provide a coating which meets the foregoing aims and objects and is particularly suited for use in protecting asphalt pavement.

Other objects of the invention will be made clear or become apparent from the following detailed description and claims.

A coating composition meeting the aims and objects stated above can be satisfactorily prepared from a combination of a water slurry of inorganic inert filler material to which a latex polymer and coupling agent have been added along with a polyphenyl compound to which plasticizer and surfactant have been added.

The water slurry is prepared by combining a suitable filler material in a quantity of 15-35 weight percent (all percentages are based upon total components) with water in a quantity of 40-60 weight percent. Suitable fillers include clay, talc, sand, lime, mica, bentonite, fly ash and slate. The filler and water mixture is blended with heating to a temperature of between approximately 140°-210° F., preferably about 160° F. During heating, 1-10 weight percent of latex polymer is added. Any one of various known latexes may be utilized, including ethylene vinyl acetate, acrylic and styrene butadiene. Preferably, although not essential, 0.05-2.0 weight percent of a coupling agent such as zirconium aluminate or a titanate is also added to the aqueous blend. Suitable titanates include $CaTiO_3$, $Ba_2Ti_3O_8$, alkyl titanates or titanate chelates such as tetrabutyltitanate acetylacetonate titanate, and bis(2,4-pentanedianate-O,O')bis(2-propanolato)-titanate. Up to 1 percent of a suitable colorant such as carbon black, dispersant or powder, may also be added to the water base slurry.

A binder base comprising polyphenyls, plasticizer and surfactant is separately prepared. This binder includes 10-50 weight percent polyphenyls, primarily (50% or greater) tertiary or higher. A preferred range for the polyphenyls is 20-35 weight percent with 23-30 weight percent being most preferred.

The polyphenyls useful in the present invention are represented by the general formula:

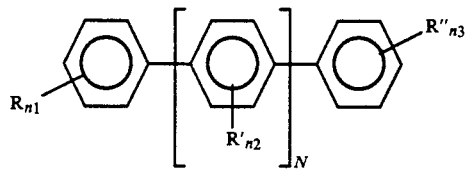

where
R and $R'' = H$, $CH_3$ or $C_2H_5$
$R' = H$, $CH_3$, $C_2H_5$ or phenyl;
$n_1$ and $n_3 = 1-5$
$n_2 = 1-4$; and
$N = 1-4$ If terphenyl is the primary component, it and higher polyphenyls should comprise at least 85 weight percent of the total polyphenyl; if quaterphenyl and higher polyphenyls comprise the primary component, they should comprise at least 50 percent by weight of the total polyphenyls. The binder also includes 1-6 percent by weight of a compatible plasticizer such as phthalate, terphenyl, dioctyl phthalate, phosphates such as tricresyl phosphate, polymeric esters, citrates and vinyl plasticizers such as vinyl acetate and methyl methacrylate. These binder base weight percents are based on the total finished product composition. Finally, a high molecular weight nonionic polyester surfactant is added to the binder base in a quantity of 0.1 to 1.0 weight percent. The binder base is heated to a temperature of approximately 180°-300° F., preferably about 220° F. Upon achievement of the desired temperature, the binder base is then combined with the aqueous slurry and blended at high shear until a homogenous emulsified mixture is achieved.

It is desirable, though not essential, to add to the emulsified mixture an adhesion promoter (abrasion resistive) of the type readily available and known to those skilled in the art, such as the polyamine sold under the trademark Indulin 814 by Westvaco Co. of Charleston Heights, S.C. Also desirable in some cases, though not essential, is the addition of a small quantity of thickener (viscosity elevator) such as the acrylic copolymer Acrysol ASE-95 (trademark) sold by Rohm and Haas Company of Philadelphia, Pa., another product well known to those skilled in the art. Another optional but often desirable additive is a bacteriostat such as the product Dowicil 75, sold by Dow Chemical Company of Midland, Mich. This product is also well known to those skilled in the art. Quantitative ranges for these optional components are set forth in Examples 1 and 2 below.

The final product should have a viscosity in the range of 60-100 (77° F., Krebs), a nonoffensive odor and a solids content of 48-52 weight percent. The product is black in color so as to blend with normal asphalt surfaces. Manifestly, other colors can be selected if desired.

The coating prepared in accordance with the described procedure will pass a fuel resistance test in accordance with American Society for Testing and Materials (A.S.T.M.) Standard D1010 which is also U.S.A. Federal Specification R-P-355d.

In most cases, it is desirable to use ethylene vinyl acetate as the preferred latex polymer in the weight percent range specified. A preferred group of latexes is the group consisting of ethylene vinyl acetate, acrylic and styrene butadiene. The preferred polyphenyl binder is quaterphenyl isomers and higher polyphenyls. The polyphenyls are utilized at the weight percent noted above. While various plasticizers which are compatible with the specified polyphenyls can be utilized, dioctyl phthalate is a preferred plasticizer. A preferred group of plasticizers is the group consisting of phthalate, terphenyl, dioctyl phthalate, tricresyl phosphate, polymeric esters, vinyl acetate and methyl methacrylate. The surfactant employed is preferably a high molecular weight polyester nonionic with a density of 1 gram per cc and an H.L.B. in the range of 5-7. The preferred fillers are mica and bentonite used in the stated total weight percent range with the mica and bentonite preferably present in a ratio of 10:1 mica:bentonite. A preferred group of fillers is the group consisting of clay, talc, sand, lime, mica, bentonite, fly ash and slate. The preferred colorant is carbon black which may be dispersant or powder. Other colors may, of course, be selected. The preferred coupling agent is zirconium aluminate, preferably zirconium aluminate which is amino functional.

A general formula as discussed above is set forth in Example 1 below.

EXAMPLE 1

General Formula

| Component | % by weight |
| --- | --- |
| water | 40-60 |
| filler | 15-35 |
| colorant | 0-3 |
| coupling agent | 0-2 |
| latex polymer | 1-10 |
| polyphenyl binder | 10-30 |
| surfactant | .05-1 |
| plasticizer | 1-6 |
| adhesion promoter | 0-.2 |
| thickener | 0-.5 |
| bacteriostat | 0-.2 |

A preferred formula is set forth as Example 2 below:

EXAMPLE 2

Preferred Formula

| Component | % by weight |
| --- | --- |
| water | 48.25 |
| mica-filler | 20.4 |
| bentonite-filler | 2.4 |
| carbon black | 0.8 |
| ethylene vinyl acetate-latex | 2.5 |
| zirconium aluminate-coupling agent | 0.1 |
| polyphenyl consisting of 10 wt. percent terphenyls, 60 wt. percent quaterphenyls, and 30 wt. percent penta and hexaphenyls | 23.4 |
| dioctylphthalate-plasticizer | 1.5 |
| surfactant-high M.W. polyester nonionic, H.L.B. 5-7, 1 g/cc density | 0.2 |
| adhesion promoter | 0.1 |
| thickener | 0.25 |
| bacteriostat | 0.1 |

Additional illustrative formulations are set forth in Examples 3 through 7.

EXAMPLE 3

Same formula as Example 2 except the polyphenyl consists of 15 wt. percent terphenyls, 50 wt. percent quaterphenyls, and 35 wt. percent penta and hexaphenyls.

EXAMPLE 4

Same formula as Example 2 except the polyphenyl consists of 15 wt. percent terphenyls, 65 wt. percent quaterphenyls, and 20 wt. percent penta and hexaphenyls.

EXAMPLE 5

Same formula as Example 2 except the polyphenyl consists of 10 wt. percent terphenyls, 70 wt. percent quaterphenyls, and 20 wt. percent penta and hexaphenyls.

EXAMPLE 6

Same formula as Example 2 except the polyphenyl consists of 7 wt. percent terphenyls, 63 wt. percent quaterphenyls, and 30 wt. percent penta and hexaphenyls.

EXAMPLE 7

Same formula as Example 2 except the polyphenyl consists of 7 wt. percent terphenyls, 70 wt. percent quaterphenyls, and 23 wt. percent penta and hexaphenyls.

It will be appreciated that modifications apparent to those skilled in the art may be made in the formulations set forth above without departing from the scope of the present invention which is intended to be limited only by the appended claims. For example, in some instances it may be desired to utilize a treated or reactive filler as opposed to the nonreactive fillers as specified above. This may be done in order to impart particular properties to the coating composition for a special application. Another possible modification would be to utilize natural rubber in place of one of the latex compounds specified above, although at the present time natural rubber is not a desired substitute. The composition set forth in Examples 1 and 2 above may be used without further modification but may also be diluted up to 30% by volume with water, although preferably no more than about 20%.

It will also be apparent that the invention contemplates a method of preparing a fuel resistant coating composition of the type set forth above which includes the steps of preparing a water slurry of filler, coupling agent, latex polymer and colorant in the quantities specified, and preferably also including a coupling agent; heating the water slurry to a temperature of 140°–210° F., preferably 160° F.; preparing a binder comprising polyphenyls, plasticizer and a nonionic high molecular weight polyester surfactant in the quantities specified; heating the binder mixture to a temperature of about 180°–300° F., preferably about 220° F.; and then combining the heated slurry and heated binder to produce the coating composition. The method may also encompass adding to the final composition an adhesion promoter, thickener and bacteriostat in the weight percentages previously indicated.

We claim:

1. A protective coating comprising an oil-in-water slurry of: 40–60 weight percent water, 15–35 weight percent filler, 0.05 to 1 weight percent of a high molecular weight nonionic surfactant, 1–10 weight percent latex polymer, 10–50 weight percent room temperature solid polyphenyls of the formula:

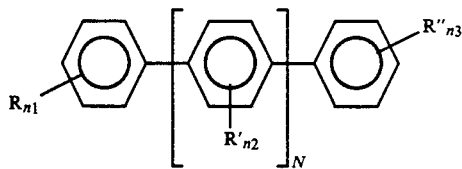

where
R and R''=H, $CH_3$ or $C_2H_5$
R'=H, $CH_3$, $C_2H_5$ or phenyl;
$n_1$ and $n_3$=1–5
$n_2$=1–4; and
N=1–4 and 1–6 weight percent compatible plasticizer.

2. A coating composition as set forth in claim 1 wherein is included 0.1–2 weight percent of a coupling agent comprising zirconium aluminate or a titanate.

3. A coating composition as set forth in claim 1 wherein said polyphenyls consist of primarily quaternary and higher polyphenyls.

4. A coating composition as set forth in claim 3, wherein said latex polymer comprises ethylene vinyl acetate.

5. A coating composition as set forth in claim 3, wherein is included up to 1 percent by weight carbon black.

6. A petroleum resistant coating composition comprising an oil-in-water slurry of: 40–60 weight percent water; 15–35 weight percent of a filler selected from the group consisting of clay, talc, sand, lime, mica, bentonite, fly ash and slate; 0 to 2 weight percent of a coupling agent selected from the group consisting of zirconium aluminate and titanates; 1 to 10 weight percent latex polymer selected from the group consisting of ethylene vinyl acetate, acrylic and styrene butadiene; 10–50 weight percent room temperature solid polyphenyls of the formula:

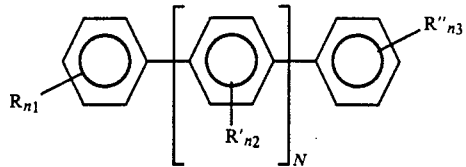

where
R and R''=H, $CH_3$ or $C_2H_5$
R'=H, $CH_3$, $C_2H_5$ or phenyl;
$n_1$ and $n_3$=1–5
$n_2$=1–4; and
N=1–4

1–6 percent by weight compatible plasticizer; and approximately 0.05 to 1 weight percent of a high molecular weight nonionic surfactant having an H.L.B. of 5 to 7.

7. A petroleum resistant coating as set forth in claim 6, wherein is included up to 1 percent by weight carbon black.

8. A petroleum resistant coating as set forth in claim 6, wherein is included 0.01 to 0.2 weight percent of an adhesion promoter, 0.1 to 0.5 weight percent of a thickener, and 0.05 to 0.2 weight percent of a bacteriocide.

9. A method of preparing a petroleum resistant coating composition, said method comprising:
combining 40–60 weight percent water, 15–35 weight percent filler, 0 to 2 weight percent coupling agent comprising zirconium aluminate of a titanate, 0.05 to 1 weight percent of a high molecular weight nonionic surfactant, 10–50 weight percent room temperature solid polyphenyls of the formula:

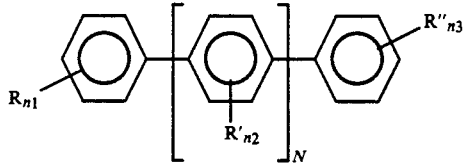

where
R and R''=H, $CH_3$ or $C_2H_5$
R'=H, $CH_3$, $C_2H_5$ or phenyl;
$n_1$ and $n_3$=1–5
$n_2$=1–4; and
N=1–4

1–10 weight percent latex polymer and 1–6 weight percent of a compatible plasticizer to present an aqueous slurry.

10. A method as set forth in claim 9, wherein is included the steps of:
preparing a water slurry of said filler, said coupling agent, and said latex polymer;
heating said water slurry to a temperature of about 140°–210° F.;
preparing a binder comprising said polyphenyls, said surfactant, and said plasticizer;
heating said binder to a temperature of about 180°–300° F.; and
combining said heated slurry and said heated binder.

11. A method as set forth in claim 10, wherein said first mentioned heating step comprises heating to about 160° F. and the subsequent heating step comprises heating to about 220° F.

* * * * *